Dec. 13, 1966  R. W. BEEBE  3,291,094
CLEAT DEVICE FOR WATER BORNE VESSEL
Filed May 17, 1965
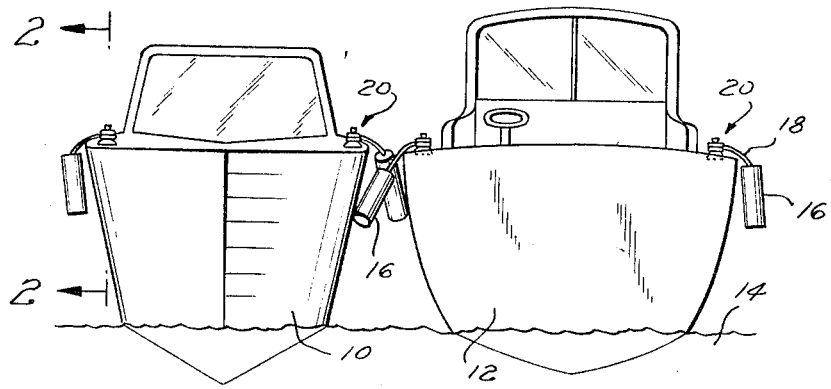
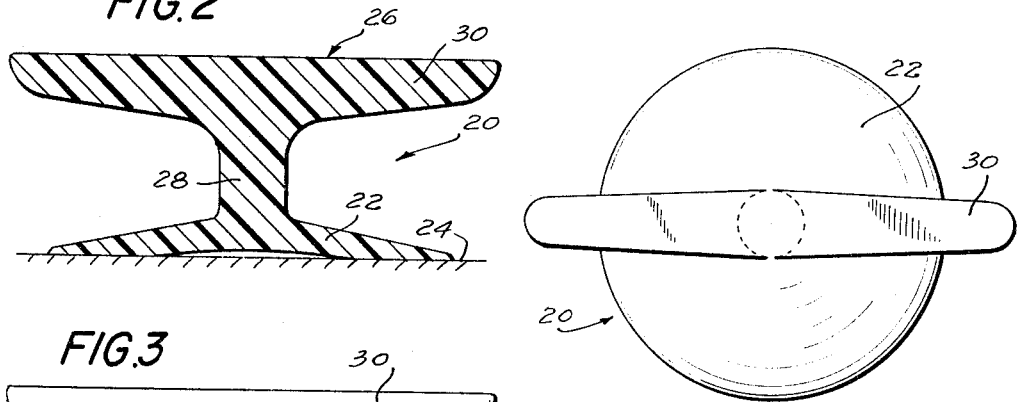
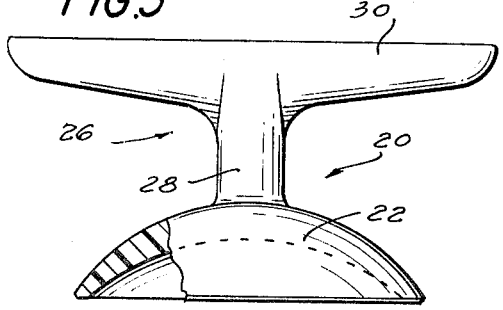
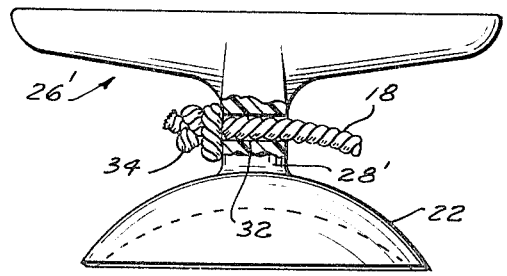
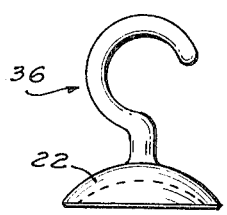
INVENTOR
RODERICK W. BEEBE
BY
Nolte & Nolte
ATTORNEYS

United States Patent Office

3,291,094
Patented Dec. 13, 1966

3,291,094
CLEAT DEVICE FOR WATER BORNE VESSEL
Roderick W. Beebe, Huntington, N.Y., assignor of one-third to Albert C. Nolte, Jr., New York, N.Y.
Filed May 17, 1965, Ser. No. 456,161
5 Claims. (Cl. 114—218)

The present invention relates to vessels such as boats which float on a body of water.

As is well known, when such vessels are docked, they are located closely adjacent to each other. One of a group of vessels will have its anchor dropped while an adjoining vessel will tie onto the anchored vessel so that in this way snarling of the cords, chains, or the like, which support the anchors, will be avoided. As a result the vessels are located one directly next to the other, and because of the bobbing of the vessels on the body of water rubbing of the vessels against each other is to be avoided. Such rubbing is conventionally prevented by hanging fenders between adjoining vessels, these fenders being supported by suitable cords such as shock cords which are in turn attached to cleats or the like which are carried by the vessels.

At the present time it is conventional for such cleats to be made of metal, for example, and to be bolted to suitable parts of the vessel. The result of this construction is that the location of the cleats is fixed, and in fact a plurality of such cleats are required to be situated at given intervals along the vessel so that there is some choice as to the location of the fenders in order to prevent rubbing of the adjoining vessels against each other. This necessity of fastening a plurality of cleats to a vessel and the necessity of situating the fenders at the locations of the cleats is highly undesirable because of the presence of unused cleats and the limited choice in fender location resulting from the fixed location of the cleats.

It is, therefore, a primary object of the present invention to avoid the above drawbacks by making it possible to attach to any desired location of a vessel a cord which supports a fender, without requiring any fastening elements such as cleats or the like to be permanently fixed with the vessel at predetermined intervals therealong.

Also, it is an object of the present invention to provide a structure of the above type which is extremely simple and inexpensive and which can be readily mounted and dismounted without any inconvenience.

At the same time, it is an object of the present invention to provide a structure of this type which will very reliably mount a fender so that there is no possibility of the fender falling or being pulled from the vessel to which it is attached.

Primarily the structure of the invention includes a suction cup capable of being attached to any exposed smooth surface portion of a vessel, this suction cup carrying, in accordance with a further feature of the invention, a means by which a fender-supporting cord can be attached to the suction cup. In this way it is possible to apply the suction cup to a smooth exposed surface of the vessel at any desired location only when the vessel is docked, so that the necessity of a plurality of cleats or the like permanently attached to the vessel is avoided and at the same time the choice of the location of the fenders is not determined by the fixed locations of the plurality of cleats.

The invention is illustrated by way of example in the accompanying drawings which form part of the application and in which:

FIG. 1 illustrates vessels which are docked at locations where they adjoin each other;

FIG. 2 is a sectional elevation of one possible embodiment of a device according to the present invention;

FIG. 3 shows, in a partly sectional elevation, the device of FIG. 2 before it is attached to an exposed smooth surface of a vessel;

FIG. 4 is a top plan view of the device of FIG. 3;

FIG. 5 is a partly sectional elevation showing how it is possible to attach a cord to the structure of the invention; and FIG. 6 shows another embodiment of a device according to the present invention.

Referring now to FIG. 1, there is illustrated therein a pair of vessels 10 and 12 which are docked in a conventional manner and which float on a body of water 14, so that these vessels can freely bob up and down due to ripples or waves in the body of water 14. In order to prevent rubbing of the vessels 10 and 12 against each other it is conventional to situate fenders 16 between the vessels, and of course additional fenders 16 will be situated between further vessels located on opposite sides of the vessels shown in FIG. 1. These fenders 16 are in the form of yieldable bodies of rope or the like which are carried by cords 18 which may be in the form of conventional shock cord so that they are stretchable. These shock cords 18 are carried by the devices 20, of the present invention, shown mounted on exposed surfaces of the vessels 10 and 12 in FIG. 1.

Referring to FIGS. 2–4, the device 20 includes a suction cup 22 made of soft rubber, as is well known, and this suction cup is shown in FIGS. 3 and 4 before it is attached to an exposed surface such as the smooth surface 24 indicated in FIG. 2. This surface 24 may be any smooth exterior surface situated along the rail of the vessel or any other suitable part thereof and may take the form of a smooth metal surface or a smooth coating paint on wood, or the like.

A means is provided for attaching a cord 18 to the suction cup 22, and this means in the illustrated example takes the form of a cleat 26 of T-shaped configuration. This cleat 26 has a relatively narrow neck portion 28 across which a relatively wide portion 30 of the cleat extends, and it is this narrow neck portion 28 which extends from the wide portion 30 to the suction cup 22. The narrow neck portion 28 is integral with the wide portion 30 and in a preferred construction is also integral with the suction cup 22, the entire device being made of rubber, for example, with the suction cup 22 being of a relatively soft rubber, while the cleat 26 is made of a harder rubber.

In order to attach the suction cup 22 to any desired convenient location it is simply pressed against a smooth surface 24, and this suction cup will reliably remain in its attached position irrespective of the force pulling on a fender 16 and acting through a shock cord 18 on the cleat 26. The shock cord 18 can be wound around the neck 28 and the ends of bar 30 of the cleat 26, in a well known manner.

The stretchable shock cord can yield to absorb some of the force pulling on a fender.

As is indicated in FIG. 5, however, the cleats 26′ is formed at its neck 28′ with an opening 32 through which the shock cord 18 passes, this shock cord being provided at its free end with a suitable knot 34, so that in this way the shock cord is permanently attached with the cleat 26′. Otherwise the embodiment of FIG. 5 is identical with that of FIGS. 2–4.

As is indicated in FIG. 6, instead of a cleat, a simple hook 36 may be formed integrally with the suction cup 22, this hook 36 also being made of hard rubber while the suction cup 22 is made of a soft rubber. The cord 18 can extend around and be attached to the hook 36 in any desired manner, so that the structure of FIG. 6 will also achieve the results of the invention.

I claim:
1. A cleat device for a water borne vessel, comprising a suction cup of plastic material; and a cleat of plastic material harder than that of said suction cup and of one piece with said suction cup, said cleat, being of substantially T configuration, having a substantially wide portion spaced from said suction cup and a substantialy narrow neck portion extending from and joining said suction cup and the wide portion of said cleat.

2. A device for a water borne vessel, comprising a suction cup of plastic material; and a cord tying portion of plastic material harder than that of said suction cup and of one piece with said suction cup, said cord tying portion having a substantially T configuration for holding an end of a cord.

3. A device for a water borne vessel, comprising a suction cup of rubber; and a cord tying portion of rubber harder than that of said suction cup and of one piece with said suction cup, said cord tying portion having a substantially T configuration for holding a knotted end of a cord.

4. A cleat device for a water borne vessel, comprising a suction cup of rubber; and a cleat of rubbery harder than that of said suction cup and of one piece with said suction cup, said cleat having a substantially T configuration with a wide portion spaced from said suction cup and a substantially narrow neck portion extending from and joining said suction cup and the wide portion of said cleat.

5. A cleat device as claimed in claim 4, further comprising an aperture formed through the neck portion of said cleat.

References Cited by the Examiner

UNITED STATES PATENTS

| | | | |
|---|---|---|---|
| 1,694,312 | 12/1928 | Clark | 114—218 |
| 2,145,142 | 1/1939 | Stout | 248—206 |
| 2,319,727 | 5/1943 | Duggan | 248—206 |
| 2,451,194 | 10/1948 | Braun | 248—206 |
| 2,536,551 | 1/1951 | Johnson | 114—219 |
| 2,870,733 | 1/1959 | Winther | 114—218 |
| 3,155,238 | 11/1964 | Bennett | 248—206 X |

MILTON BUCHLER, *Primary Examiner.*

B. BELKIN, *Assistant Examiner.*